United States Patent
Hamabe et al.

(10) Patent No.: US 9,511,684 B2
(45) Date of Patent: Dec. 6, 2016

(54) VEHICLE SEAT CONTROL DEVICE AND VEHICLE SEAT DEVICE

(71) Applicants: TOYOTA JIDOSHA KABUSHIKI KAISHA, Toyota-shi, Aichi-ken (JP); TOYOTA BOSHOKU KABUSHIKI KAISHA, Kariya-shi, Aichi (JP)

(72) Inventors: Tsutomu Hamabe, Nisshin (JP); Reiji Iwaihara, Toyota (JP); Kohshi Katoh, Hadano (JP); Eishi Takeuchi, Nagoya (JP); Hikaru Sato, Toyota (JP)

(73) Assignees: TOYOTA JIDOSHA KABUSHIKI KAISHA, Toyota-Shi (JP); TOYOTA BOSHOKU KABUSHIKI KAISHA, Kariya-Shi (JP)

( * ) Notice: Subject to any disclaimer, the term of this patent is extended or adjusted under 35 U.S.C. 154(b) by 0 days.

(21) Appl. No.: 14/695,467

(22) Filed: Apr. 24, 2015

(65) Prior Publication Data
US 2015/0306982 A1 Oct. 29, 2015

(30) Foreign Application Priority Data
Apr. 25, 2014 (JP) ................................. 2014-091979

(51) Int. Cl.
*B60N 2/44* (2006.01)
*B60N 2/02* (2006.01)
*B60N 2/39* (2006.01)

(52) U.S. Cl.
CPC ............... *B60N 2/0244* (2013.01); *B60N 2/39* (2013.01); *B60N 2002/0208* (2013.01); *B60N 2002/0212* (2013.01); *B60N 2002/0256* (2013.01)

(58) Field of Classification Search
USPC ....... 79/284.3, 284.4, 284.9, 284.11; 701/49, 701/45, 36, 300, 48
See application file for complete search history.

(56) References Cited

U.S. PATENT DOCUMENTS

| | | | |
|---|---|---|---|
| 4,822,099 A | 4/1989 | Negi et al. | |
| 6,382,604 B2 * | 5/2002 | St. Clair | B60N 2/0244 180/89.15 |
| 2003/0023363 A1 * | 1/2003 | Katz | B60N 2/0244 701/49 |
| 2006/0129309 A1 * | 6/2006 | Alewine | G01C 21/26 701/34.4 |
| 2007/0255469 A1 * | 11/2007 | Uenuma | B60N 2/0232 701/49 |
| 2008/0091322 A1 * | 4/2008 | Phipps | B60N 2/448 701/48 |
| 2008/0133092 A1 * | 6/2008 | Hozumi | B60N 2/0244 701/49 |
| 2008/0162002 A1 * | 7/2008 | Bacher | B60N 2/0276 701/45 |
| 2010/0030435 A1 * | 2/2010 | Hattori | B60N 2/449 701/49 |
| 2010/0179730 A1 * | 7/2010 | Hiemenz | B60N 2/4242 701/45 |
| 2010/0191426 A1 * | 7/2010 | Miyajima | B60N 2/0244 701/49 |

(Continued)

FOREIGN PATENT DOCUMENTS

| | | |
|---|---|---|
| DE | 10252204 B3 | 2/2004 |
| EP | 1531080 A2 | 5/2005 |

(Continued)

*Primary Examiner* — Thomas Tarcza
*Assistant Examiner* — Richard Goldman
(74) *Attorney, Agent, or Firm* — Andrews Kurth Kenyon LLP

(57) ABSTRACT

A vehicle seat control device includes a seat unit on which an occupant sits, a seat unit support mechanism that supports the seat unit such that a right side and a left side of the seat unit are capable of moving relative to each other in a vehicle up-down direction, a lock actuator for fixing the relative movement in the up-down direction of the seat unit supported by the seat unit support mechanism, and a seat ECU that controls the lock actuator so as to fix the seat unit in cases in which a predetermined fixing condition for fixing the seat unit has been satisfied.

11 Claims, 12 Drawing Sheets

(56) References Cited

U.S. PATENT DOCUMENTS

| | | | | |
|---|---|---|---|---|
| 2010/0332079 A1* | 12/2010 | Wang | B60N 2/4242 | 701/37 |
| 2011/0301809 A1* | 12/2011 | Pywell | B60N 2/0228 | 701/36 |
| 2012/0041648 A1* | 2/2012 | Yamaguchi | B60N 2/002 | 701/49 |
| 2013/0006478 A1* | 1/2013 | Lin | B60N 2/10 | 701/49 |
| 2014/0052345 A1* | 2/2014 | Tobin | B60R 16/037 | 701/49 |
| 2014/0191550 A1 | 7/2014 | Katoh et al. | | |
| 2014/0316660 A1* | 10/2014 | Le | B60N 2/0244 | 701/49 |

FOREIGN PATENT DOCUMENTS

| | | |
|---|---|---|
| GB | 2503094 A | 12/2013 |
| JP | S61-291233 A | 12/1986 |
| JP | H06-49431 B2 | 6/1994 |
| JP | 2001-277913 A | 10/2001 |
| JP | 2003-118454 A | 4/2003 |
| JP | 2005-313661 A | 11/2005 |
| JP | 2009286153 A | 12/2009 |
| JP | 2014-133479 A | 7/2014 |
| JP | 2015-024680 A | 2/2015 |
| WO | 2013/021497 A1 | 2/2013 |
| WO | 2014/108790 A1 | 7/2014 |

\* cited by examiner

VEHICLE SEAT CONTROL DEVICE AND VEHICLE SEAT DEVICE

CROSS-REFERENCE TO RELATED APPLICATION

This application is based on and claims priority under 35 USC 119 from Japanese Patent Application, No. 2014-091979 filed Apr. 25, 2014, the disclosure of which is incorporated by reference herein.

BACKGROUND

1. Technical Field

The present invention relates to a vehicle seat control device and a vehicle seat device.

2. Related Art

Generally in vehicle seat devices, a seat unit is fixed to seat rails that are fixed to the vehicle body, and the seat unit is movable along the seat rails. The seat unit is moreover provided with a seat cushion with an adjustable reclining angle.

In such vehicle seat devices, once an occupant has sat down and set the seat position, the vehicle seat device does not move, and maintains the seated posture of the occupant in a fixed state while driving. However, there is room for improvement in consideration of the movement of the occupant when steering.

Accordingly, technology described in the pamphlet of International Publication No. 2013-021497 (Patent Document 1) includes a seat unit support section that supports a seat unit such that a right side and a left side of the seat unit move relative to each other in an up-down direction of the vehicle seat device. This thereby enables posture to be easily maintained when steering or turning.

However, in the technology of Patent Document 1, the right side and the left side of the seat unit are capable of moving relative to each other in the vehicle up-down direction at all times, which may be considered inconvenient or troublesome when not driving. There is accordingly room for improvement.

SUMMARY

In consideration of the above circumstances, an object of the present invention is to increase the user-friendliness of a vehicle seat device in which the right side and the left side of a seat unit are capable of moving relative to each other in the vehicle up-down direction.

In order to achieve the above object, a vehicle seat control device of a first aspect of the present invention includes a fixing section that fixes movement in a vehicle up-down direction of a seat unit on which an occupant sits, with the seat unit supported by a seat unit support section that supports the seat unit such that a right side and a left side of the seat unit are capable of moving relative to each other in the up-down direction, and a control section that controls the fixing section so as to fix the seat unit in cases in which a predetermined fixing condition for fixing the seat unit has been satisfied.

According to the first aspect of the invention, the occupant sits on the seat unit. The seat unit support section supports the seat unit such that the right side and the left side of the seat unit are capable of moving relative to each other in the up-down direction of the vehicle.

The relative movement in the up-down direction of the seat unit supported by the seat unit support section is fixed by the fixing section. The control section controls the fixing section so as to fix the seat unit in cases in which a predetermined fixing condition for fixing the seat unit has been satisfied.

Namely, by setting as the fixing condition a condition in which the seat unit is preferably fixed, the seat unit can be fixed in cases in which the fixing condition has been satisfied, thereby enabling an increase in the user-friendliness of the vehicle seat device in which the right side and the left side of the seat unit are capable of moving relative to each other in the vehicle up-down direction.

Note that, as in a second aspect of the invention, configuration may be made such that cases in which the fixing condition has been satisfied are cases in which data that indicates at least one action, selected from the group consisting of an occupant boarding the vehicle, an occupant alighting the vehicle, and an occupant preparing to alight, has been detected by a detection section for detecting the data.

Specifically, as in a third aspect of the present invention, configuration may be made such that the control section controls the fixing section so as to fix the seat unit in cases in which, as an occupant boarding the vehicle or alighting the vehicle, the detection section has detected a parking range for a shift position and opening of a door. Alternatively, as in a fourth aspect of the present invention, configuration may be made such that the control section controls the fixing section so as to fix the seat unit in cases in which, as an occupant alighting the vehicle, the detection section has detected disappearance of pressure on the seat unit. Alternatively, as in a fifth aspect of the present invention, configuration may be made such that the control section controls the fixing section so as to fix the seat unit in cases in which, as an occupant alighting the vehicle, the detection section has detected a turned off engine and an unfastened seatbelt. Alternatively, as in a sixth aspect of the present invention, configuration may be made such that the control section controls the fixing section so as to fix the seat unit in cases in which, as an occupant alighting the vehicle, the detection section has detected a turned off engine. Alternatively, as in a seventh aspect of the present invention, configuration may be made such that the control section controls the fixing section so as to fix the seat unit in cases in which, as an occupant preparing to alight, the detection section has detected a turned off engine and a vehicle speed of 0. Alternatively, as in an eighth aspect of the present invention, configuration may be made further including a fixing instruction section that instructs fixing of the seat unit by the fixing section, wherein the control section controls the fixing section so as to fix the seat unit in cases in which, as the fixing condition, fixing has been instructed by the fixing instruction section.

Moreover, as in a ninth aspect of the present invention, configuration may be made further including an instruction section to instruct fixing, and fixing release, of the seat unit by the fixing section, wherein the control section prioritizes instruction by the instruction section and controls the fixing section according to instruction of the instruction section. This thereby enables the occupant to fix and release fixing of the seat unit at will.

As in a tenth aspect of the present invention, configuration may be made such that the control section further controls the fixing section so as to make the seat unit movable in cases in which a predetermined movement condition for making the seat unit movable has been satisfied.

As in an eleventh aspect of the present invention, a vehicle seat device may include a seat unit on which an occupant sits, a seat unit support section that supports the seat unit such that a right side and a left side of the seat unit are capable of moving relative to each other in a vehicle up-down direction, and the vehicle seat control device of any one of the first aspect to the tenth aspect.

The present invention described above exhibits the advantageous effect of enabling increased user-friendliness in a vehicle seat device in which a right side and a left side of a seat unit are capable of moving relative to each other in the vehicle up-down direction.

BRIEF DESCRIPTION OF THE DRAWINGS

Embodiments of the present invention will be described in detail based on the following figures, wherein.

DETAILED DESCRIPTION OF THE INVENTION

Figure 1:
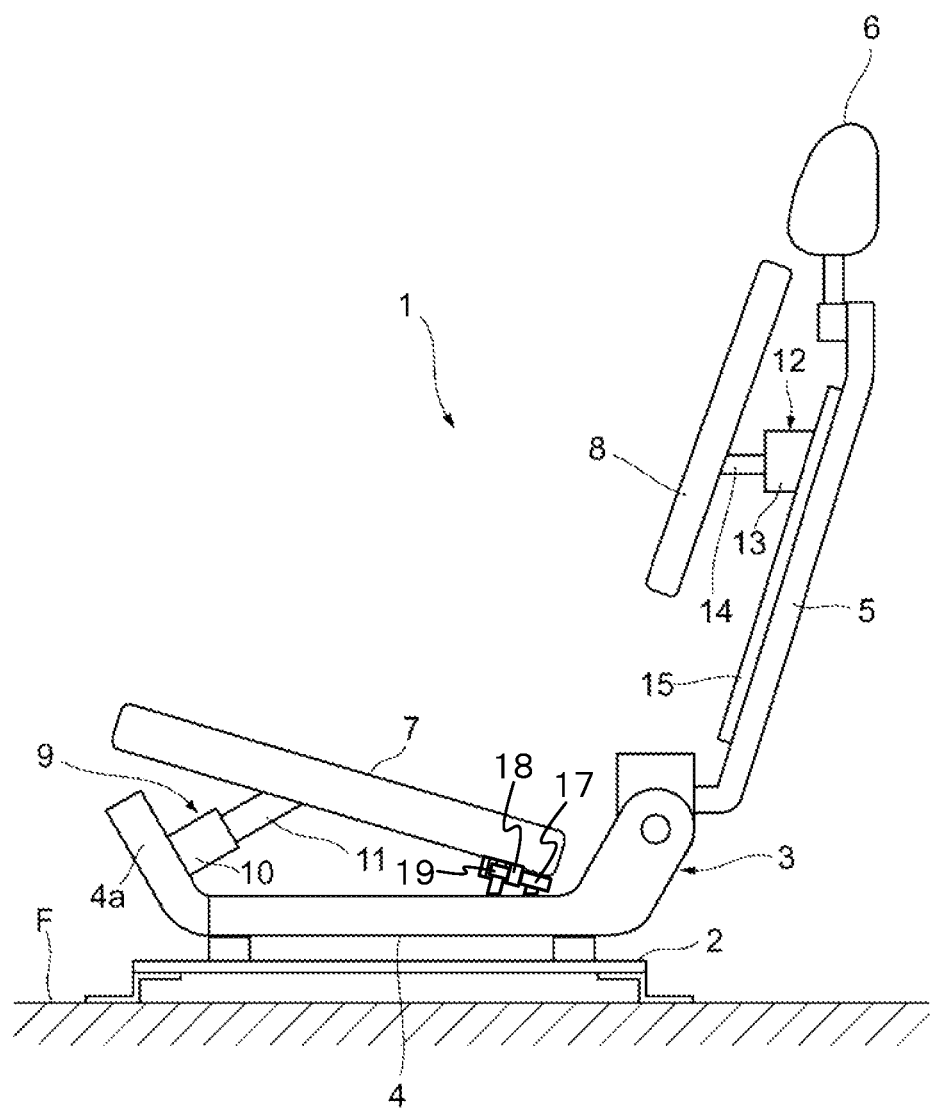
FIG. 1 is a schematic side view of a vehicle seat device according to an exemplary embodiment.
Figure 2:
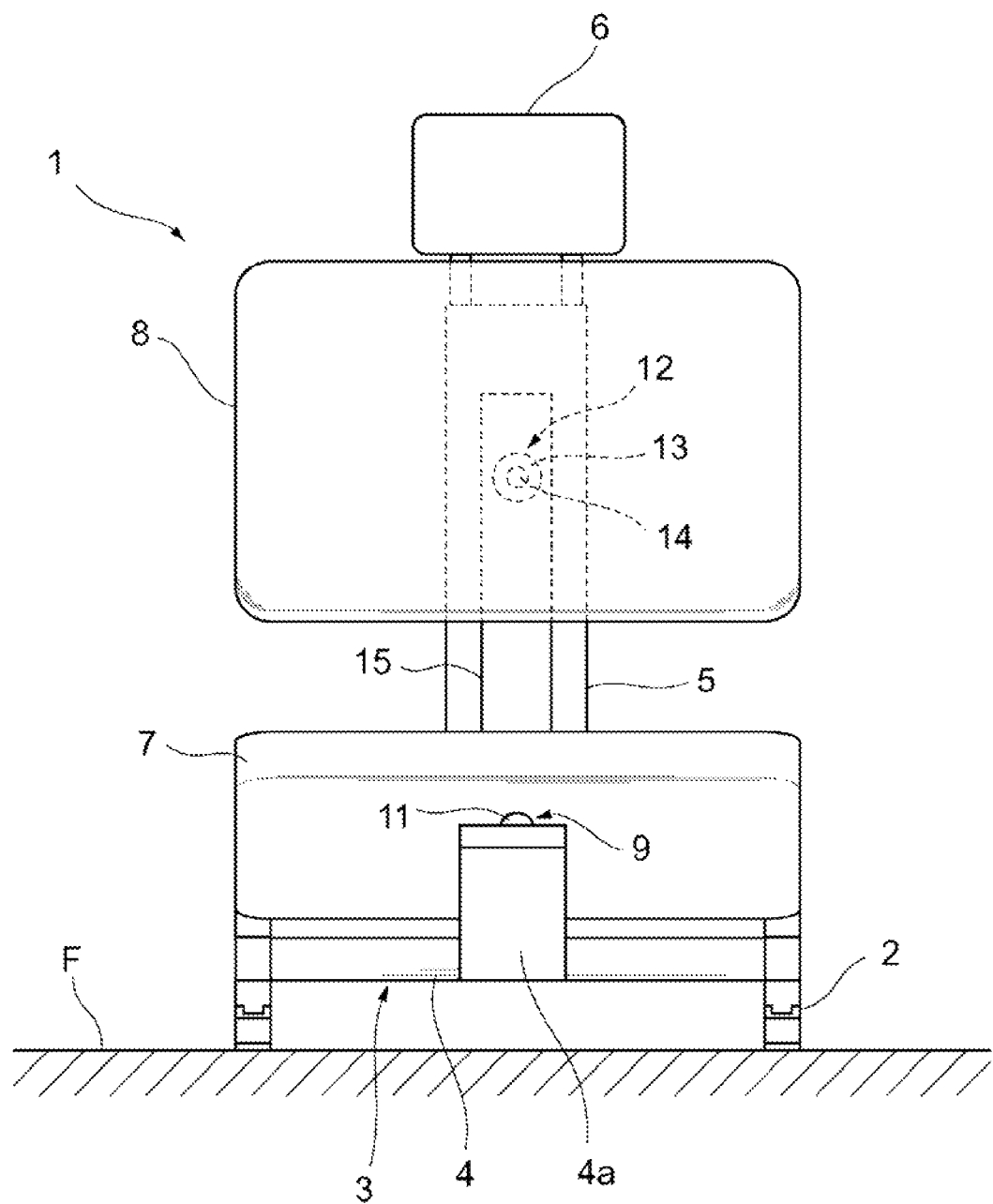
FIG. 2 is a schematic front view of a vehicle seat device according to the present exemplary embodiment.
Figure 3A:
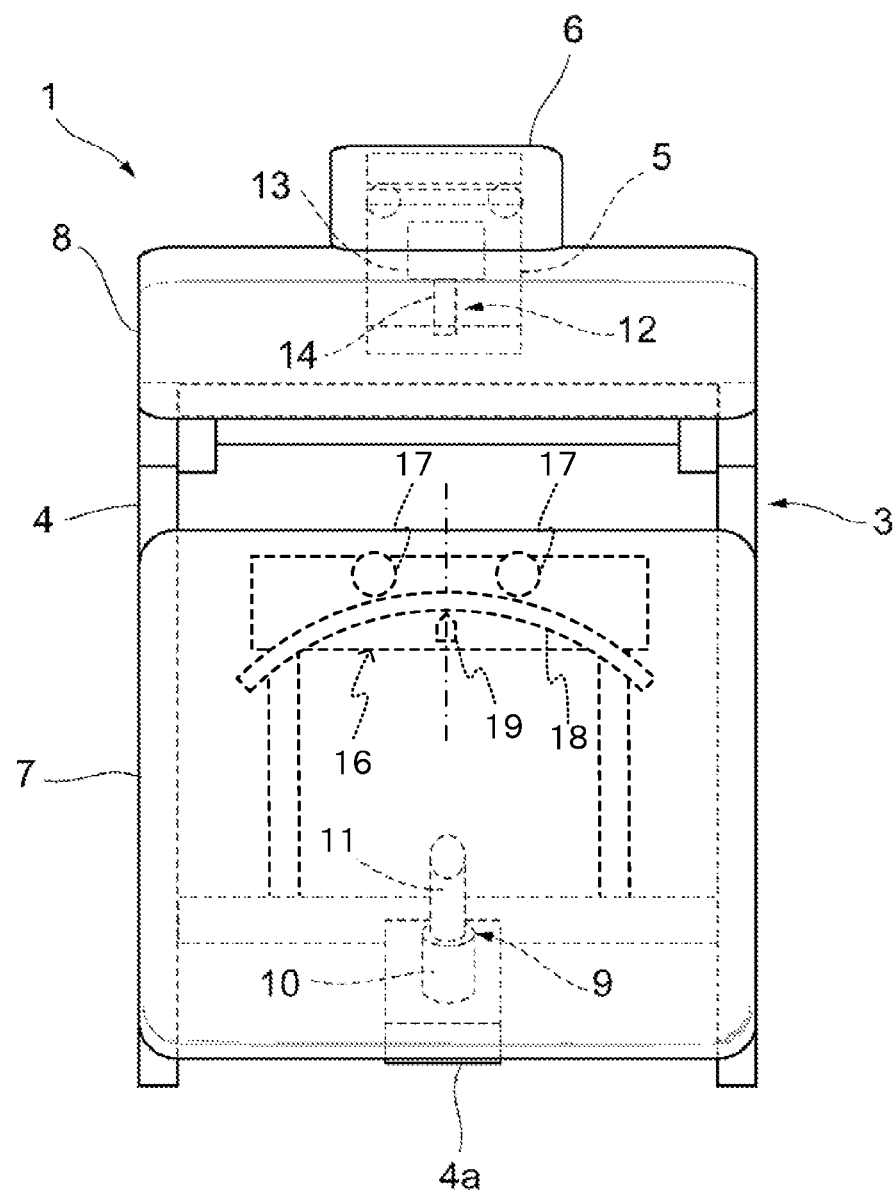
FIG. 3A is a schematic plan view of a vehicle seat device according to the present exemplary embodiment.
Figure 3B:
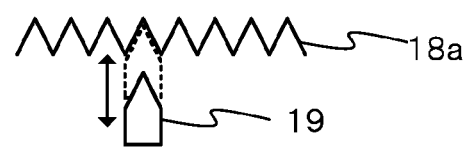
FIG. 3B is an enlarged view of a fixing tooth section.
Figure 4:
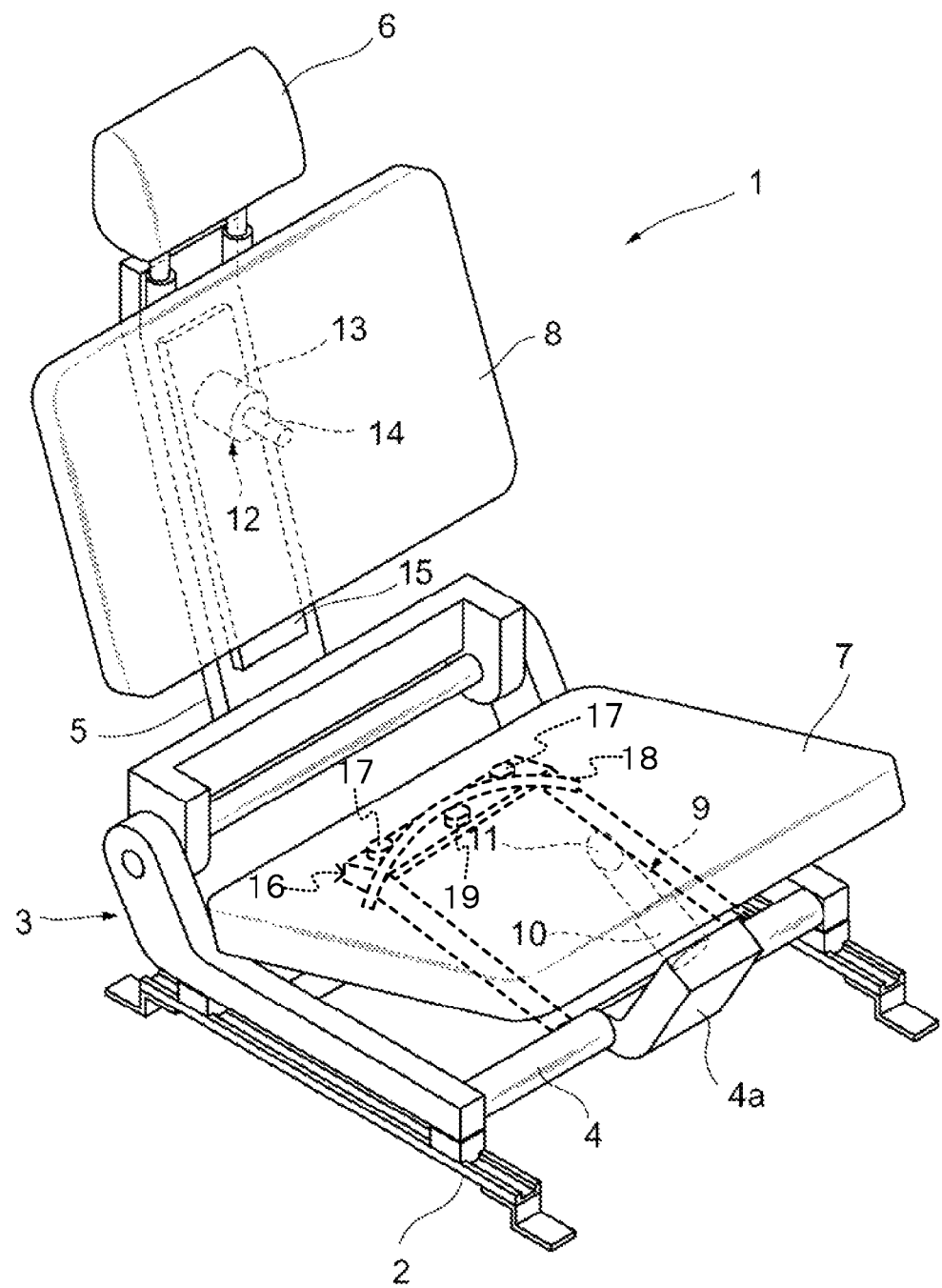
FIG. 4 is a schematic perspective view of a vehicle seat device according to the present exemplary embodiment.

Detailed explanation follows regarding an example of an exemplary embodiment of the present invention, with reference to the drawings. FIG. 1 is a schematic side view of a vehicle seat device according to the present exemplary embodiment. FIG. 2 is a schematic front view of a vehicle seat device according to the present exemplary embodiment. FIG. 3A is a schematic plan view of a vehicle seat device according to the present exemplary embodiment, and FIG. 3B is an enlarged view of a fixing tooth section. FIG. 4 is a schematic perspective view of a vehicle seat device according to the present exemplary embodiment. Note that for the sake of simplification, members such as shock absorbing materials are omitted in each of the drawings.

In a vehicle seat device 1, a seat frame 3 is attached to a seat rail 2 fixed to a vehicle floor F so as to be capable of sliding in the vehicle front-rear direction.

The seat frame 3 includes a first seat frame section 4 that is slidably attached to the seat rail 2 and is disposed substantially parallel to the vehicle floor F, and a second seat frame 5 that projects up from the first seat frame section 4 and to which a headrest 6 is attached. Although omitted from illustration in the drawings, the second seat frame 5 is reclinably attached to the first seat frame section 4 using a reclining mechanism.

A seat unit support mechanism 9 that supports a seat unit 7 so as to be capable of swiveling is attached to the first seat frame section 4, and a seatback support mechanism 12 that supports a seatback 8 so as to be capable of swiveling is attached to the second seat frame 5.

The seat unit 7 mainly has the pelvis and femurs of an occupant placed thereon, and the seatback 8 is disposed to the rear side of the seat unit 7 and mainly has the shoulder blades of the occupant resting thereon. The shapes of the seat unit 7 and the seatback 8 are not limited to the shapes illustrated in the drawings, and various designs are possible from ergonomic or industrial perspectives.

As illustrated in FIG. 3A, in the present exemplary embodiment an auxiliary frame 16 including rollers 17 that assist swiveling of the seat unit 7 is provided to the first seat frame section 4. An auxiliary rail 18 provided to the seat unit 7 contacts the rollers 17, and through the auxiliary rail 18, the rollers 17 bear weight applied to the seat unit 7 to assist swiveling of the seat unit 7. A fixing tooth 19 for fixing the seat unit 7 is provided to the auxiliary frame 16, and as illustrated in FIG. 3B, the auxiliary rail 18 is provided with a gear 18a. The fixing tooth 19 engages with the gear 18a to prevent swiveling of the seat unit 7, enabling fixing of the seat unit 7. In the present exemplary embodiment, the fixing tooth 19 is moved by a lock actuator, described later, so as to fix and release fixing of the seat unit 7. Although the rollers 17 are provided to the auxiliary frame 16 and the auxiliary rail 18 is provided to the seat unit 7, configuration may also be made in which the auxiliary rail 18 is provided to the auxiliary frame 16, and the rollers 17 are provided to the seat unit 7.

Figure 5:
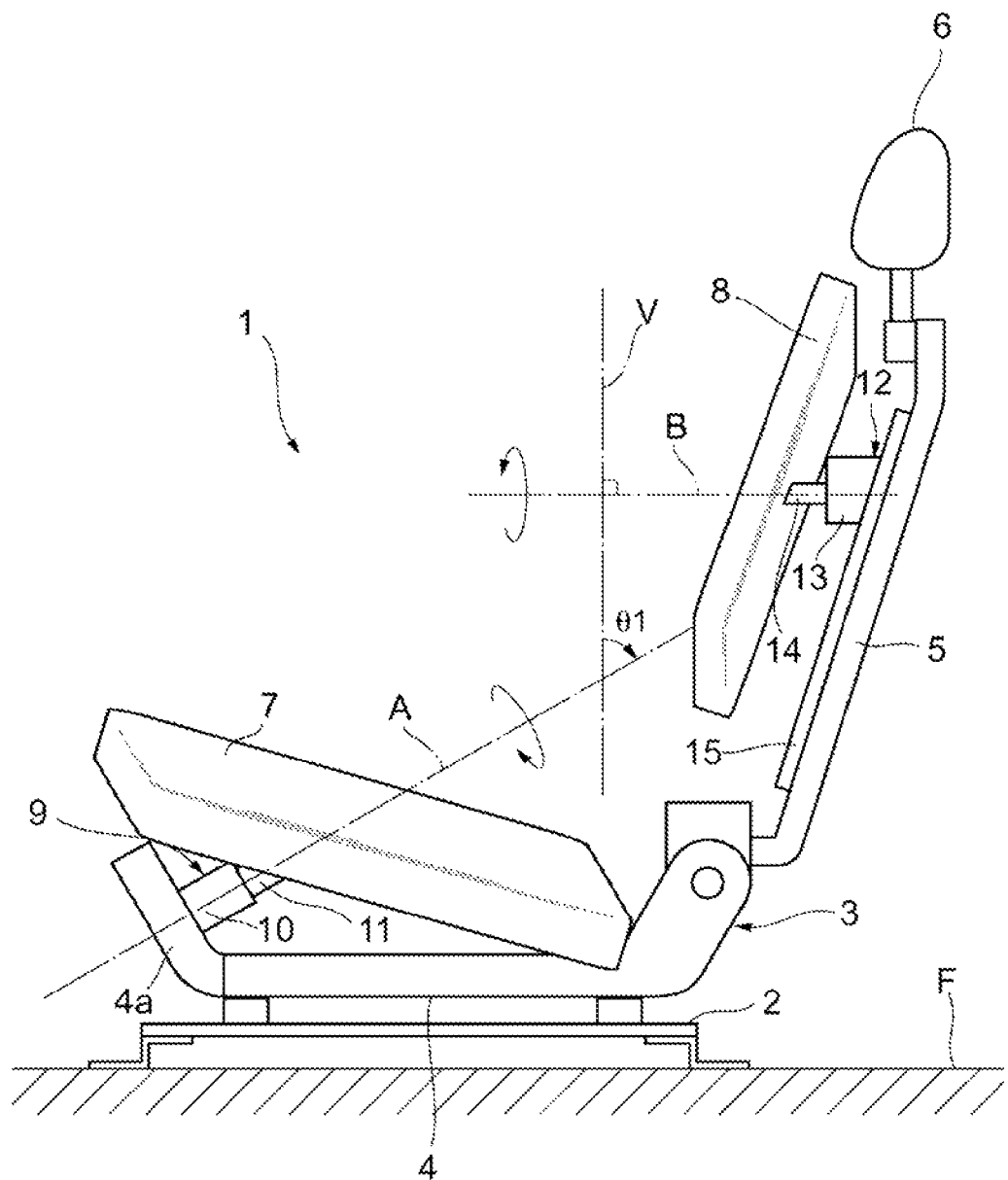
FIG. 5 is a schematic side view of a vehicle seat device in which a seat unit support mechanism has swiveled about its rotation axis toward the right as viewed from the front.
Figure 6:
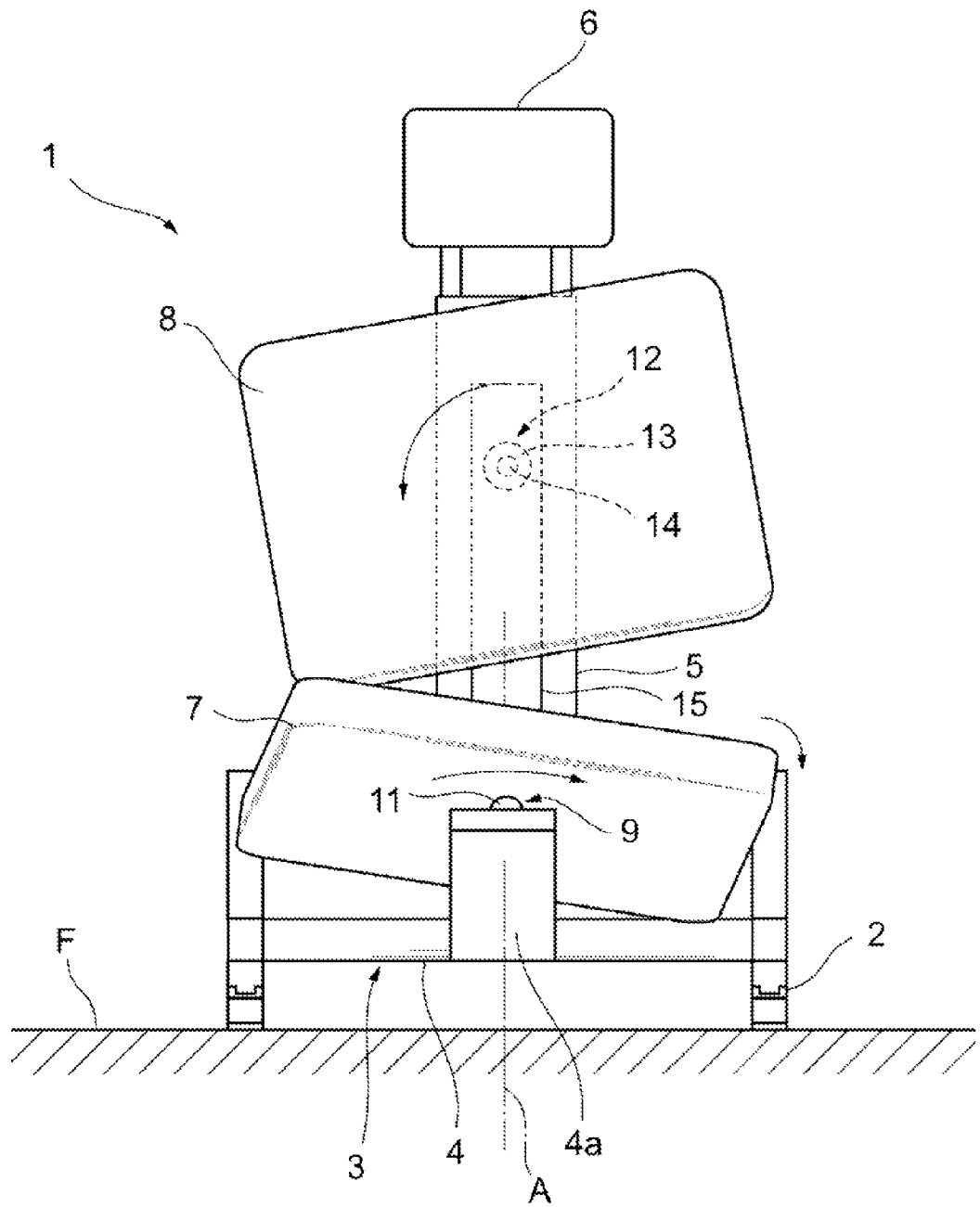
FIG. 6 is a schematic front view of a vehicle seat device in which a seat unit support mechanism has swiveled about its rotation axis toward the right as viewed from the front.
Figure 7:
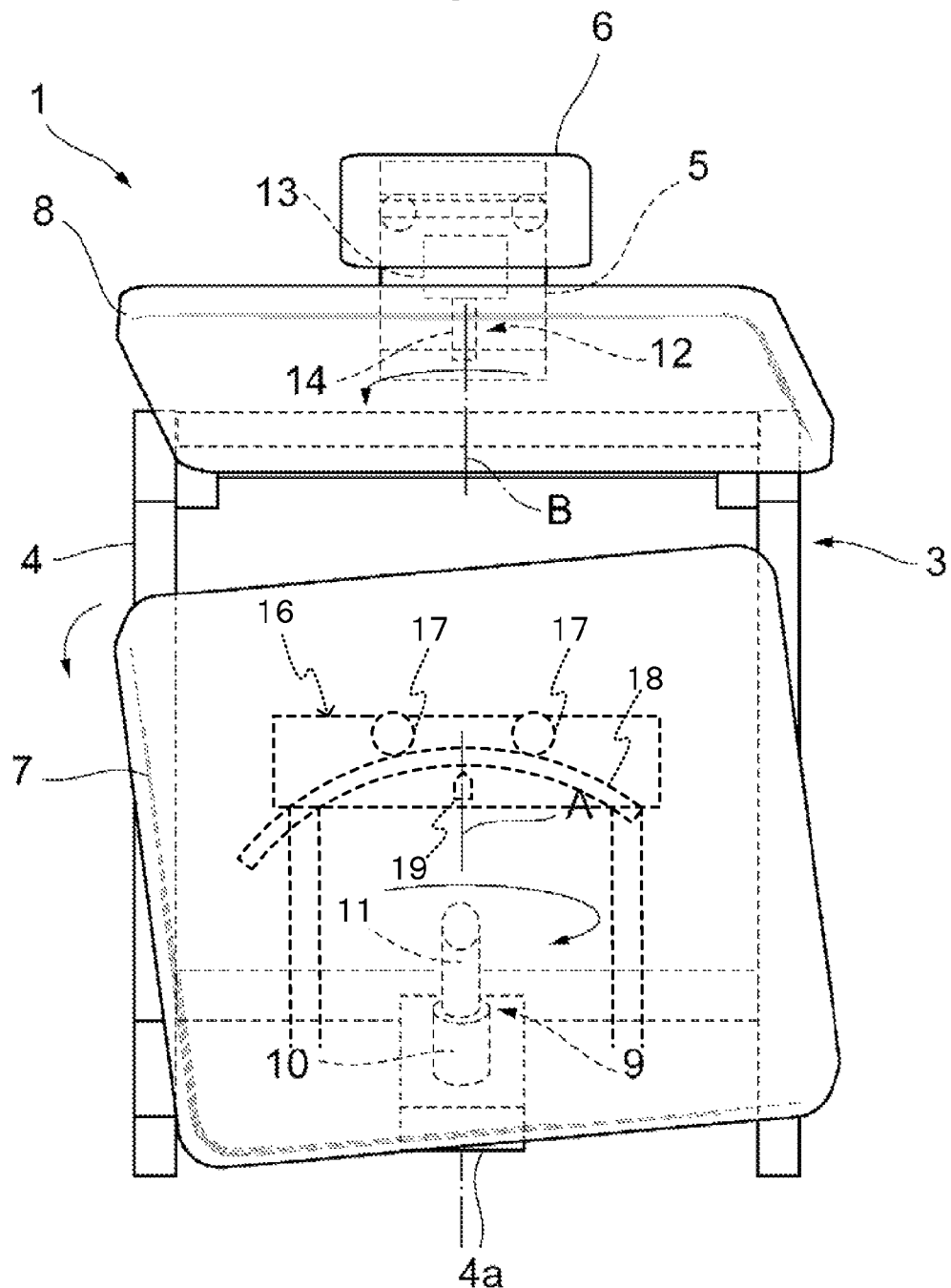
FIG. 7 is a schematic plan view of a vehicle seat device in which a seat unit support mechanism has swiveled about its rotation axis toward the right as viewed from the front.

FIG. 5 is a schematic side view of the vehicle seat device 1 in which a seat unit support mechanism has swiveled about its rotation axis toward the right as viewed from the front. FIG. 6 is a schematic front view of the vehicle seat device 1 in which the seat unit support mechanism has swiveled about its rotation axis toward the right as viewed from the front. FIG. 7 is a schematic plan view of the vehicle seat device 1 in which the seat unit support mechanism has swiveled about its rotation axis toward the right as viewed from the front.

As illustrated in FIG. 1 to FIG. 7, the seat unit support mechanism 9 serving as a seat unit support section is attached to a seat unit support mechanism attachment portion 4a extending toward the front and top of the vehicle seat device 1 from a leading end of the first seat frame section 4. The seat unit support mechanism attachment portion 4a includes a thrust shaft bearing 10 fixed to the first seat frame section 4, and a thrust shaft 11 fixed to the seat unit 7 and coupled so as to be capable of swiveling in the thrust shaft bearing 10, thereby supporting the seat unit 7 so as to be capable of swiveling. A rotation axis A of the seat unit 7 through the seat unit support mechanism 9 is accordingly aligned with the rotation axis of the thrust shaft 11.

The rotation axis A is set so as to be higher at the rear than at the front in the front-rear direction of the vehicle seat device 1, and so as to pass through the vicinity of the lumbar region of an occupant seated in the vehicle seat device 1. The seat unit 7, and the pelvis of the occupant supported on the seat unit 7, can accordingly swivel about the rotation axis A in a roll direction and a yaw direction of the vehicle. Note that the lumbar region refers to a portion of the human body including the lumbar spine and trunk muscle surrounding the lumbar spine, and the vicinity of the lumbar region refers to both the lumbar region itself and the area surrounding the lumbar region.

The rotation axis A of the seat unit 7 may, for example, be set by setting the angle of inclination of the seat unit support mechanism attachment portion 4a to which the seat unit support mechanism 9 is attached. The rotation axis A can be made to pass through the spine (lumbar spine) of the occupant by attaching the seat section support mechanism 9 at a left-right direction central portion of the seat unit support mechanism attachment portion 4a.

As illustrated in FIG. 5 to FIG. 7, when the thrust shaft 11 of the seat unit support mechanism 9 swivels toward the right (clockwise) about the rotation axis A as viewed from the front of the vehicle seat device 1, the seat unit 7 swivels about the rotation axis A in the roll direction and the yaw direction of the vehicle to adopt the following orientation.

Due to the seat unit 7 swiveling about the rotation axis A in the vehicle roll direction, the right side of the seat unit 7 adopts an orientation displaced upwards relative to the left side of the seat unit 7 in the up-down direction of the vehicle seat device 1. The pelvis of the occupant seated in the seat unit 7 accordingly swivels about the rotation axis A in the vehicle roll direction, and the right side of the pelvis adopts an orientation displaced upwards relative to the left side of the pelvis in the up-down direction of the occupant. Note that in the present exemplary embodiment, this swiveling of the seat unit 7 and the pelvis about the rotation axis A in the vehicle roll direction is referred to as "swiveling clockwise in the roll direction". "Clockwise" here means the direction in which the seat unit 7 has swiveled in the front view of the vehicle seat device 1 illustrated in FIG. 6.

Due to the seat unit 7 swiveling about the rotation axis A in the vehicle yaw direction, the right side of the seat unit 7 adopts an orientation displaced toward the front relative to the left side of the seat unit 7 in the front-rear direction of the vehicle seat device 1. The pelvis of the occupant seated in the seat unit 7 accordingly swivels about the rotation axis A in the vehicle yaw direction, and the right side of the pelvis adopts an orientation displaced toward the front relative to the left side of the pelvis in the front-rear direction of the occupant. Note that in the present exemplary embodiment, this swiveling of the seat unit 7 and the pelvis about the rotation axis A in the vehicle yaw direction is referred to as "swiveling counterclockwise in the yaw direction". "Counterclockwise" here refers to the direction in which the seat unit 7 has swiveled in the plan view of the vehicle seat device 1 illustrated in FIG. 7.

Although not illustrated in the drawings, in the opposite to the above, when the thrust shaft 11 of the seat unit support mechanism 9 swivels toward the left (counterclockwise) about the rotation axis A as viewed from the front of the vehicle seat device 1, the seat unit 7 swivels about the rotation axis A in the roll direction and the yaw direction of the vehicle to adopt the orientation described below.

Due to the seat unit 7 swiveling about the rotation axis A in the vehicle roll direction, the left side of the seat unit 7 adopts an orientation displaced upwards relative to the right side of the seat unit 7 in the up-down direction of the vehicle seat device 1. The pelvis of the occupant seated in the seat unit 7 accordingly swivels about the rotation axis A in the vehicle roll direction, and the left side of the pelvis adopts an orientation displaced upwards relative to the right side of the pelvis in the up-down direction of the occupant. Note that in the present exemplary embodiment, this swiveling of the seat unit 7 and the pelvis about the rotation axis A in the vehicle roll direction is referred to as "swiveling counterclockwise in the roll direction". "Counterclockwise" here refers to a swivel direction of the seat unit 7 as viewed from the front of the vehicle seat device 1, and means the opposite direction to the swivel direction of the seat unit 7 illustrated by the arrow in FIG. 6.

Due to the seat unit 7 swiveling about the rotation axis A in the vehicle yaw direction, the left side of the seat unit 7 adopts an orientation displaced toward the front relative to the right side of the seat unit 7 in the front-rear direction of the vehicle seat device 1. The pelvis of the occupant seated in the seat unit 7 accordingly swivels about the rotation axis A in the vehicle yaw direction, and the left side of the pelvis adopts an orientation displaced toward the front relative to the right side of the pelvis in the front-rear direction of the occupant. Note that in the present exemplary embodiment, this swiveling of the seat unit 7 and the pelvis about the rotation axis A in the vehicle yaw direction is referred to as "swiveling clockwise in the yaw direction". "Clockwise" here refers to a swivel direction of the seat unit 7 in plan view of the vehicle seat device 1, and means the opposite direction to the swivel direction of the seat unit 7 illustrated by the arrow in FIG. 7.

As illustrated in FIG. 1 to FIG. 7, the seatback support mechanism 12 includes a thrust shaft bearing 13 fixed to the second seat frame 5, and a thrust shaft 14 fixed to the seatback 8 and rotatably coupled to the thrust shaft bearing 13, in order to support the seatback 8 so as to be capable of swiveling. A rotation axis B of the seatback 8 through the seatback support mechanism 12 is accordingly aligned with the rotation axis of the thrust shaft 14.

The rotation axis B of the seatback 8 is parallel to the front-rear direction of the vehicle seat device 1 (horizontal), and is set so as to pass through the vicinity of the chest region of the occupant seated in the vehicle seat device 1. The seatback 8, and the shoulder blades of the occupant supported resting against the seatback 8, can accordingly swivel about the rotation axis B in the roll direction of the vehicle. Note that the chest region refers to a portion of the human body including the thoracic spine and muscle surrounding the thoracic spine, and the vicinity of the chest region refers to both the chest region itself and the area surrounding the chest region.

The height of the rotation axis B of the seatback 8 can be adjusted by the attachment position of the seatback support mechanism 12 to the second seat frame 5. Namely, as illustrated in the drawings, a slide rail 15 extending in the up-down direction of the vehicle seat device 1 is attached to the second seat frame 5, enabling the seatback support mechanism 12 to be attached to the second seat frame 5 through the slide rail 15 so as to be capable of sliding in the up-down direction of the vehicle seat device 1. The shoulder blades can accordingly be supported resting against the seatback 8 accommodating differences in the physical frames of occupants, and the rotation axis B can easily be set so as to pass through the vicinity of the chest region of the occupant seated in the vehicle seat device 1. The rotation axis B can be made to pass through the spine (thoracic spine) of the occupant by attaching the seatback support mechanism 12 at a left-right direction central portion of the second seat frame 5.

As illustrated in FIG. 1 to FIG. 7, when the thrust shaft 14 of the seatback support mechanism 12 rotates toward the left about the rotation axis B as viewed from the front of the vehicle seat device 1, the seatback 8 swivels about the rotation axis B in the roll direction of the vehicle to adopt the following orientation.

Due to the seatback 8 swiveling about the rotation axis B in the vehicle roll direction, the right side of the seatback 8 adopts an orientation displaced downwards relative to the left side of the seatback 8 in the up-down direction of the vehicle seat device 1. The shoulder blades of the occupant seated in the seatback 8 accordingly swivel about the rotation axis B in the vehicle roll direction, and the right side shoulder blade adopts an orientation displaced downwards relative to the left side shoulder blade in the up-down direction of the occupant. Note that in the present exemplary embodiment, this swiveling of the seatback 8 and the shoulder blades about the rotation axis B in the vehicle roll direction is referred to as "swiveling counterclockwise in the roll direction". "Counterclockwise" here means the direction in which the seatback 8 has swiveled in the front view of the vehicle seat device 1 illustrated in FIG. 6.

Although not illustrated in the drawings, in the opposite to the above, when the thrust shaft 14 of the seatback support mechanism 12 rotates toward the right about the rotation axis B as viewed from the front of the vehicle seat device 1, the seatback 8 swivels about the rotation axis B in the roll direction of the vehicle to adopt the following orientation.

Due to the seatback 8 swiveling about the rotation axis B in the vehicle roll direction, the left side of the seatback 8 adopts an orientation displaced downwards relative to the right side of the seatback 8 in the up-down direction of the vehicle seat device 1. The shoulder blades of the occupant seated in the seatback 8 accordingly swivel about the rotation axis B in the vehicle roll direction, and the left side shoulder blade adopts an orientation displaced downward relative to the right side shoulder blade in the up-down direction of the occupant. Note that in the present exemplary embodiment, this swiveling of the seatback 8 and the shoulder blades about the rotation axis B in the vehicle roll direction is referred to as "swiveling clockwise in the roll direction". "Clockwise" here refers to a swivel direction of the seatback 8 as viewed from the front of the vehicle seat device 1, and means the opposite direction to the swivel direction of the seatback 8 illustrated by the arrow in FIG. 6.

In the vehicle seat device 1 configured as described above, the seat section 7 is retained by the seat unit support mechanism 9 so as to be capable of swiveling. The occupant can accordingly bend their lumbar spine in the left-right direction and move the right side and the left side of their pelvis relative to each other in the up-down direction of the vehicle seat device 1. This thereby enables the occupant to consciously or unconsciously adopt a posture enabling comfortable steering, and a posture that is excellent in terms of posture maintainability when turning.

Since the seatback 8 is retained by the seatback support mechanism 12 so as to be capable of swiveling, the occupant can bend their lumbar spine in the left-right direction and move their right side and left side shoulder blades relative to each other in the up-down direction of the vehicle seat device 1. This also enables the occupant to consciously or unconsciously adopt a posture enabling comfortable steering, and a posture that is excellent in terms of posture maintainability when turning.

Figure 8:
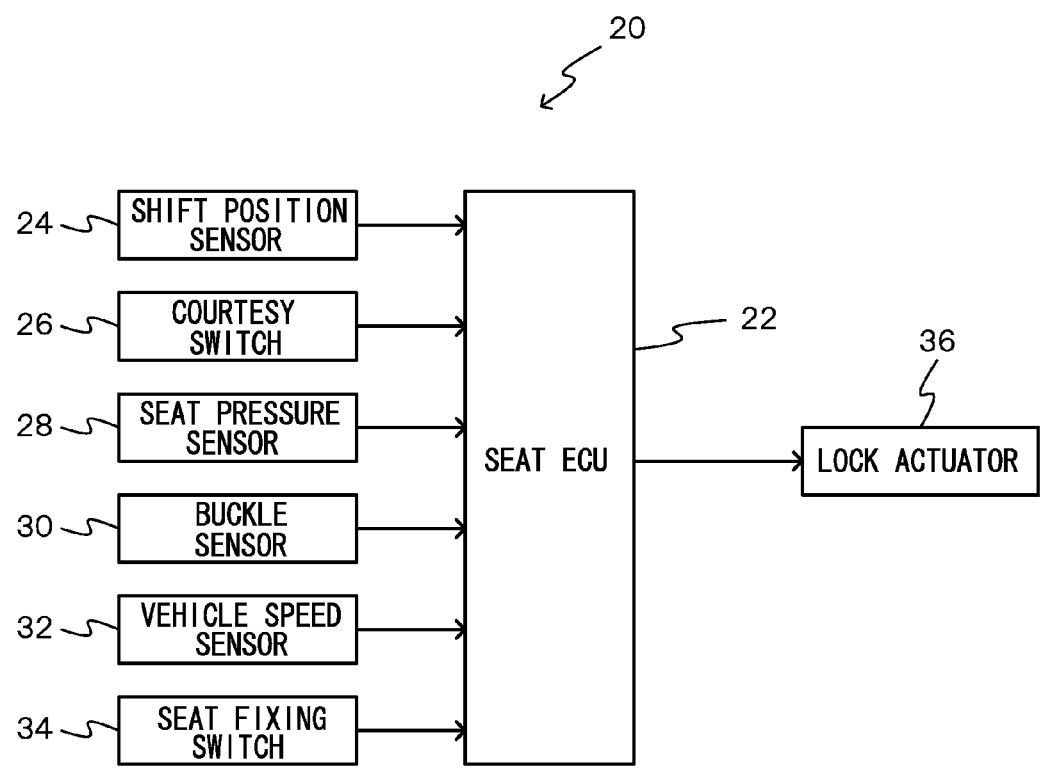
FIG. 8 is a block diagram illustrating a configuration of vehicle seat control device according to the present exemplary embodiment.

Next, explanation follows regarding configuration of a vehicle seat control device to control fixing and fixing release of the seat unit 7 of the vehicle seat device 1 configured as described above. FIG. 8 is a block diagram illustrating configuration of a vehicle seat control device 20 according to the present exemplary embodiment.

The vehicle seat control device 20 according to the present exemplary embodiment includes a seat Electronic Control Unit (ECU) to control fixing and fixing release of swiveling of the seat unit 7 of the vehicle seat device 1.

The seat ECU 22 corresponds to a control section. Various sensors and the like, serving as a detection section to detect conditions for fixing and releasing fixing of swiveling of the seat unit 7, are connected to the seat ECU 22. Specifically, in the present exemplary embodiment, as an example a shift position sensor 24, a courtesy switch 26, a seat pressure sensor 28, a buckle sensor 30, a vehicle speed sensor 32, and a seat fixing switch 34 are connected to the seat ECU 22.

The shift position sensor 24 is, for example, provided to the transmission, and detects the selected transmission shift position.

The courtesy switch 26 is provided to an opening and closing portion of a vehicle door, is configured by a switch that is switched ON and OFF by opening and closing of the door, and detects opening and closing of the door.

The seat pressure sensor 28 is provided to the seat unit 7 of the vehicle seat device 1, and detects a seated occupant by detecting pressure from the seated occupant.

The buckle sensor 30 is provided to a buckle portion of a seatbelt, and detects fastening of the seatbelt by detecting insertion of a seatbelt tongue into the buckle.

The vehicle speed sensor 32 detects the speed of vehicle travel by detecting, for example, rotation of a propeller shaft, a drive shaft, or the like.

The seat fixing switch 34 corresponds to an instruction section, and is a switch allowing the occupant to instruct fixing or fixing release of swiveling of the seat unit 7 at will. The seat fixing switch 34 may, for example, be configured so as to fix the seat unit when switched ON, and to enable swiveling of the seat unit when switched OFF, or may be configured as a three-way instruction switch capable of instructing "auto", "fix", and "fixing release" respectively.

FIG. 8 illustrates an example in which the respective sensors and switches are connected to the seat ECU 22 directly, however configuration may be made in which the respective sensors and switches are connected to the seat ECU 22 through various ECUs or the like.

A lock actuator 36 serving as a fixing section is also connected to the seat ECU 22. The lock actuator 36 drives the fixing tooth 19 mentioned above in the direction of the arrows in FIG. 3B.

Namely, the seat ECU 22 enables locking and unlocking of the fixing tooth 19 with the gear 18a by controlling drive of the lock actuator 36. This thereby enables switching between fixing and fixing release of swiveling of the seat unit 7.

Note that in the vehicle seat device 1 configured as described above, movement of the head can be suppressed to a minimum during lateral vehicle acceleration due to moving about the rotation axis passing through the vicinity of the shoulder blades of the occupant in the case of the seatback 8, and moving about the rotation axis passing through the lumbar spine of the occupant in the case of the seat unit 7. However, when the occupant is performing actions other than driving, swiveling of the seat unit 7 may be considered inconvenient and troublesome. For example, when boarding or alighting the vehicle, or preparing to drive (such as when adjusting the seat position, when adjusting the position of the steering wheel, or when operating a navigation system while parked), it is conceivable that it may be preferable for the seat unit 7 to be fixed.

Accordingly, in the present exemplary embodiment, the seat ECU 22 controls drive of the lock actuator 36 so as to fix swiveling of the seat unit 7 when a predetermined fixing condition for fixing the seat unit 7 have been satisfied (for example when a predetermined state in which it is preferable for the seat unit 7 to be fixed has been detected). The seat ECU 22 also controls drive of the lock actuator 36 to enable swiveling of the seat unit 7 when a predetermined moving condition for allowing the seat unit 7 to move has been satisfied (for example when a predetermined state in which it is preferable for the seat unit 7 to swivel has been detected).

For example, the detection of data indicating at least one action, selected from the group consisting of an occupant boarding the vehicle, an occupant alighting the vehicle, and an occupant preparing to alight, may be applied as a case in which the above fixing condition is satisfied. Explanation follows regarding examples in which control is performed so as to fix the seat unit 7 when data indicating at least one action, selected from the group consisting of an occupant boarding the vehicle, an occupant alighting the vehicle, and an occupant preparing to alight, has been detected.

Explanation follows regarding specific processing performed by the seat ECU 22 to fix the seat unit 7 when the predetermined fixing condition for fixing the seat unit 7 has been satisfied.

Firstly, explanation follows regarding a first example of processing performed by the seat ECU 22 of the vehicle seat control device 20 according to the present exemplary embodiment.

Figure 9A:
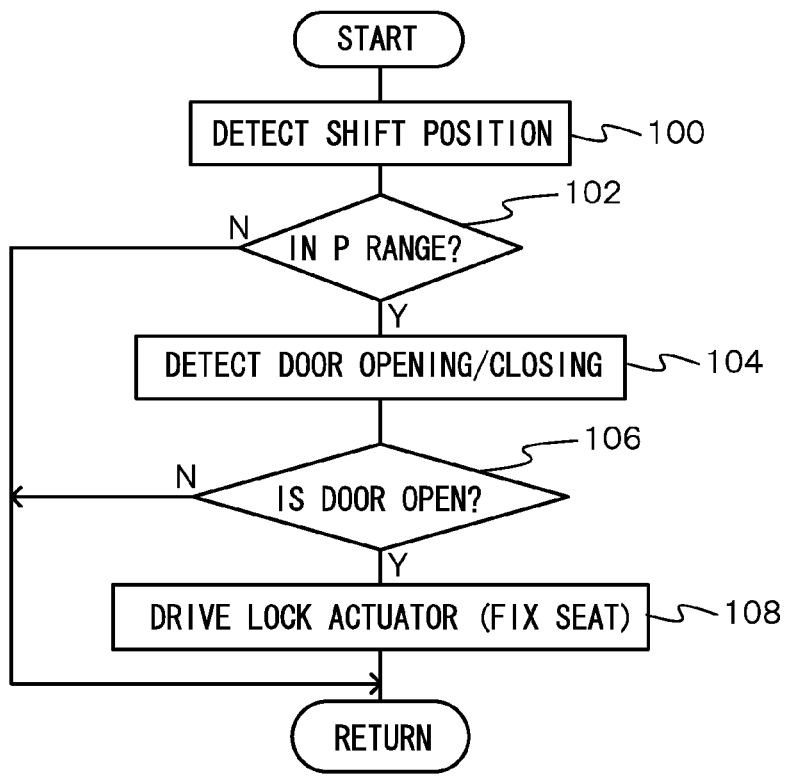
FIG. 9A is a flowchart illustrating a first example of processing performed by a seat ECU of a vehicle seat control device according to the present exemplary embodiment.

Since it is easier to board or alight with the seat unit 7 fixed, the first example describes an example in which determination is made that the occupant is boarding or alighting, and the lock actuator 36 is controlled, when the shift is detected as being in a parking range and the door is detected as being open. FIG. 9A is a flowchart illustrating the first example of processing performed by the seat ECU 22 of the vehicle seat control device 20 according to the present exemplary embodiment.

At step 100, the shift position is detected by the seat ECU 22 and processing transitions to step 102. Namely, the seat ECU 22 detects the shift position by acquiring a detection result of the shift position sensor 24.

At step 102, the seat ECU 22 determines whether or not the shift is in the parking (P) range. Processing transitions to step 104 when determination is affirmative, and processing returns to start other processing or repeat the same processing from the beginning when determination is negative.

At step 104, the seat ECU 22 determines whether the door is open or closed, and processing transitions to step 106. Namely, the seat ECU 22 acquires a signal from the courtesy switch 26 to detect whether the door is open or closed.

At step 106, the seat ECU 22 determines whether or not the door is open based on the signal from the courtesy switch 26. Processing transitions to step 108 when determination is affirmative, and processing returns to start other processing or repeat the same processing from the beginning when determination is negative.

At step 108, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 108. The processing of step 108 is accordingly skipped in such cases.

Namely, since it is easier to board or alight with the seat unit 7 fixed, fixing the seat unit 7 when it has been determined that the occupant is boarding or alighting based on the detection of the shift in the parking range and detection of the open door enables inconvenience accompanying boarding or alighting to be eliminated, and enables user-friendliness to be increased.

Next, explanation follows regarding a second example of processing performed by the seat ECU 22 of the vehicle seat control device 20 according to the present exemplary embodiment.

Figure 9B:
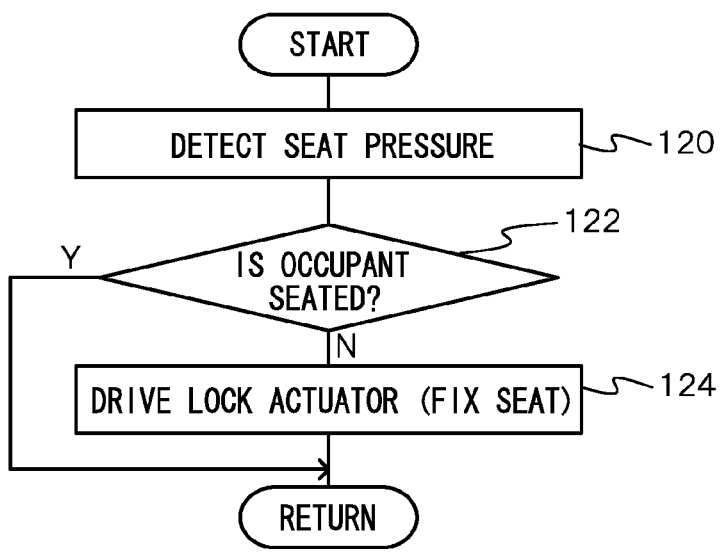
FIG. 9B is a flowchart illustrating a second example of processing performed by a seat ECU of a vehicle seat control device according to the present exemplary embodiment.

Since it is easier to board the vehicle with the seat unit 7 fixed, the second example describes an example in which determination is made that the occupant is alighting the vehicle, and the lock actuator 36 is controlled, by detecting seat pressure. FIG. 9B is a flowchart illustrating the second example of processing performed by the seat ECU 22 of the vehicle seat control device 20 according to the present exemplary embodiment.

At step 120, the seat ECU 22 detects seat pressure and processing transitions to step 122. Namely, the seat ECU 22 acquires a detection result of the seat pressure sensor 28 in order to detect seat pressure.

At step 122, the seat ECU 22 determines whether or not the occupant is seated based on the detection result of the seat pressure sensor 28. Processing transitions to step 124 when determination is negative, and processing returns to start other processing or repeat the same processing from the beginning when determination is affirmative.

At step 124, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 124. The processing of step 124 is accordingly skipped in such cases.

Namely, since it is easier to board the vehicle with the seat unit 7 fixed, inconvenience accompanying boarding can be eliminated the next time an occupant boards the vehicle, and user-friendliness can be increased, due to fixing the seat section 7 when it has been determined that the occupant is alighting the vehicle by detecting the seat pressure.

Next, explanation follows regarding a third example of processing performed by the seat ECU 22 of the vehicle seat control device 20 according to the present exemplary embodiment.

Figure 10A:
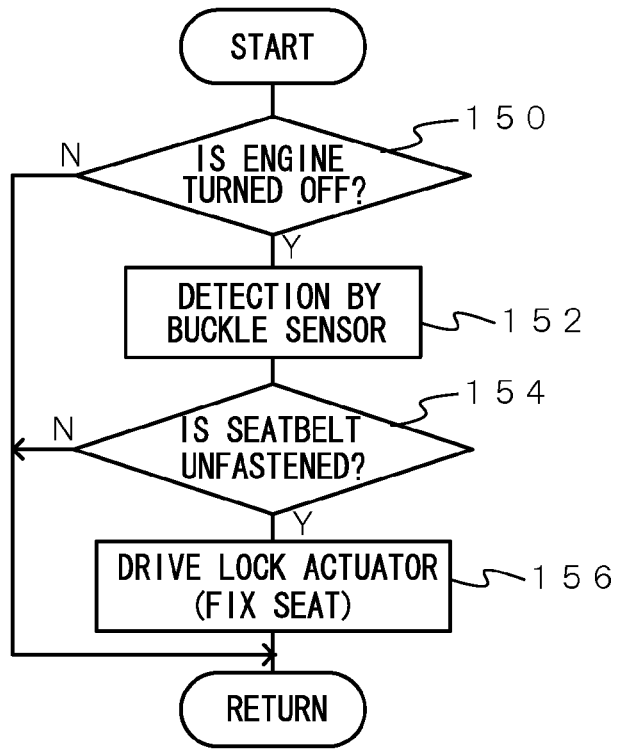
FIG. 10A is a flowchart illustrating a third example of processing performed by a seat ECU of a vehicle seat control device according to the present exemplary embodiment.

Since it is easier to alight the vehicle with the seat unit 7 fixed, the third example describes an example in which determination is made that the occupant is alighting the vehicle, and the lock actuator 36 is controlled, by detecting that the engine is turned off and detecting that the seatbelt is unfastened. FIG. 10A is a flowchart illustrating the third example of processing performed by the seat ECU 22 of the vehicle seat control device 20 according to the present exemplary embodiment.

At step 150, the seat ECU 22 determines whether or not the engine is turned off, and processing transitions to step 152 when determination is affirmative. Processing returns to start other processing or repeat the same processing from the beginning when determination is negative. Determination as to whether or not the engine is turned off is made, for example, by determining whether or not an ignition switch (IG) is switched OFF.

At step 152, the seat ECU 22 acquires a detection result of the buckle sensor 30, and processing transitions to step 154.

At step 154, the seat ECU 22 determines whether or not the seatbelt is unfastened based on the detection result from the buckle sensor 30. Processing transitions to step 156 when determination is affirmative, and processing returns to start other processing or repeat the same processing from the beginning when determination is negative.

At step 156, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 156. The processing of step 156 is accordingly skipped in such cases.

Namely, since it is easier to alight the vehicle with the seat unit 7 fixed, inconvenience accompanying alighting the vehicle can be eliminated, and user-friendliness can be increased, due to fixing the seat section 7 when it has been determined that the occupant is alighting the vehicle by detecting that the engine is turned off and detecting that the seatbelt is unfastened.

Note that in the first example, the seat unit 7 is fixed when the occupant is determined to be boarding or alighting, and in the second and third examples, the seat unit 7 is fixed when the occupant is determined to be alighting the vehicle. However, configuration may be made in which the seat unit 7 is fixed prior to boarding when the occupant is determined to be boarding the vehicle. In such cases, for example, determination may be made that the occupant is attempting to board the vehicle in cases in which the courtesy switch 26 detects that the door is open when a seated state has not been detected by the seat pressure sensor 28.

Figure 10B:
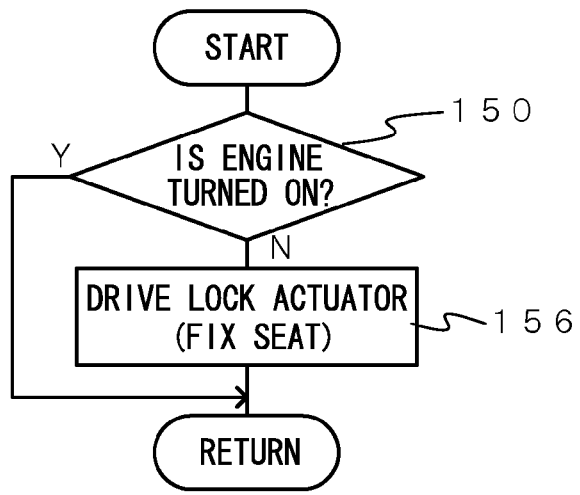
FIG. 10B is a flowchart illustrating a fourth example of processing performed by a seat ECU of a vehicle seat control device according to the present exemplary embodiment.

In the processing of the third example, steps 152 and 154 may be omitted, as in the processing of a fourth example, illustrated in FIG. 10B. Namely, since preparations for alighting, such as sorting out luggage on the passenger seat, are easier with the seat unit 7 fixed, the fourth example describes an example in which determination is made that the occupant is preparing to alight, and the lock actuator 36 is controlled, by detecting that the engine is turned off and detecting that the vehicle speed is 0. FIG. 10B is a flowchart illustrating the fourth example of processing performed by the seat ECU 22 of the vehicle seat control device 20 according to the present exemplary embodiment.

Namely, at step 150, the seat ECU 22 determines whether or not the engine is turned off, and processing transitions to step 156 when determination is affirmative. Processing returns to start other processing or repeat the same processing from the beginning when determination is negative. Determination as to whether or not the engine is turned off is made, for example, by determining whether or not the ignition switch (IG) has been switched OFF.

Then, at step 156, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 156. The processing of step 156 is accordingly skipped in such cases.

Namely, since it is easier to alight the vehicle with the seat unit 7 fixed, inconvenience accompanying alighting the vehicle can be eliminated, and user-friendliness can be increased, due to fixing the seat section 7 when it has been determined that the occupant is alighting the vehicle by detecting that the engine is turned off.

Next, explanation follows regarding a fifth example of processing performed by the seat ECU 22 of the vehicle seat control device 20 according to the present exemplary embodiment.

Figure 11A:
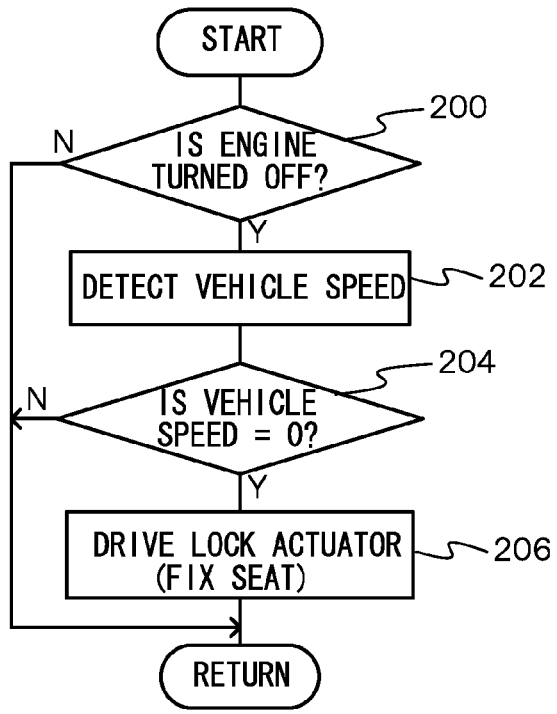
FIG. 11A is a flowchart illustrating a fifth example of processing performed by a seat ECU of a vehicle seat control device according to the present exemplary embodiment.

Since it is easier to alight the vehicle with the seat unit 7 fixed, the fifth example describes an example in which determination is made that the occupant is alighting the vehicle, and the lock actuator 36 is controlled, by detecting that the engine is turned off and detecting that vehicle speed is 0. FIG. 11A is a flowchart illustrating the fifth example of processing performed by the seat ECU 22 of the vehicle seat control device 20 according to the present exemplary embodiment.

At step 200, the seat ECU 22 determines whether or not the engine is turned off, and processing transitions to step 202 when determination is affirmative. Processing returns to start other processing or repeat the same processing from the beginning when determination is negative. The determination as to whether or not the engine is turned off is made, for example, by determining whether or not the ignition switch (IG) has been switched OFF.

At step 202, the seat ECU 22 detects the vehicle speed and processing transitions to step 204. Namely, the seat ECU 22 acquires a detection result from the vehicle speed sensor 32 to detect the vehicle speed.

At step 204, the seat ECU 22 determines whether or not the vehicle speed is 0 based on the detection result of the vehicle speed sensor 32. Processing transitions to step 206 when determination is affirmative, and processing returns to start other processing or repeat the same processing from the beginning when determination is negative.

At step 206, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 206. The processing of step 206 is accordingly skipped in such cases.

Namely, since preparations for alighting, such as sorting out luggage on the passenger seat, are easier when the seat unit 7 is fixed, preparations for alighting can be made easier, and user-friendliness can be increased, due to fixing the seat section 7 when it has been determined that the occupant is preparing to alight the vehicle by detecting that the engine is turned off and detecting that the vehicle speed is 0.

Next, explanation follows regarding a sixth example of processing performed by the seat ECU 22 of the vehicle seat control device 20 according to the present exemplary embodiment.

Figure 11B:
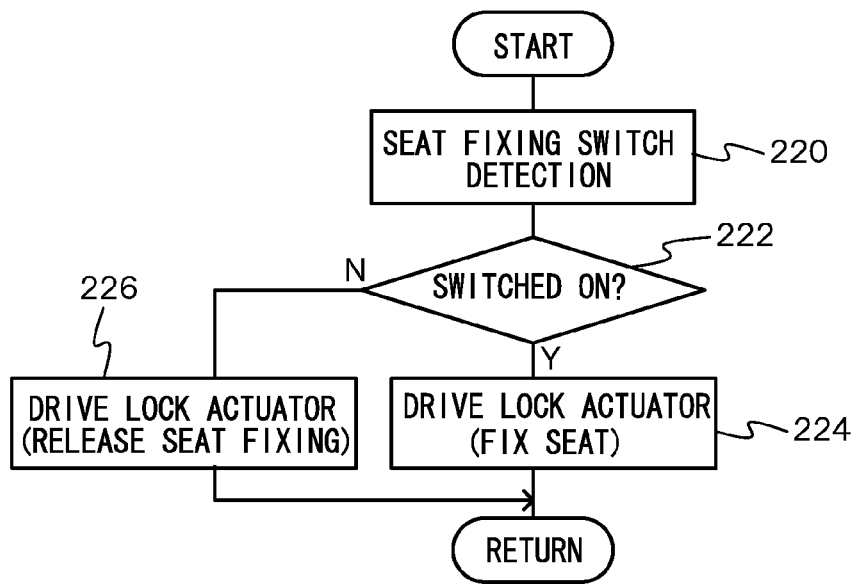
FIG. 11B is a flowchart illustrating a sixth example of processing performed by a seat ECU of a vehicle seat control device according to the present exemplary embodiment.

The sixth example describes an example in which the occupant is able to fix or release fixing of the seat unit at will by operating the seat fixing switch 34. FIG. 11B is a flowchart illustrating the sixth example of processing performed by the seat ECU 22 of the vehicle seat control device 20 according to the present exemplary embodiment.

At step 220, the seat ECU 22 detects a state of the seat fixing switch 34, and processing transitions to step 222. Namely, the seat ECU 22 acquires a signal from the seat fixing switch 34 to detect the state of the seat fixing switch 34.

At step 222, the seat ECU 22 determines whether or not the seat fixing switch 34 is switched ON based on the signal from the seat fixing switch 34. Processing transitions to step 224 when determination is affirmative, and processing transitions to step 226 when determination is negative.

At step 224, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 224. The processing of step 224 is accordingly skipped in such cases.

At step 226, the lock actuator 36 is driven under control of the seat ECU 22 so as to release fixing of the seat unit 7, and the processing sequence returns to start other processing or repeat the same processing from the beginning As a point of detail, sometimes fixing of the seat unit 7 has already been released when processing transitions to step 226. The processing of step 226 is accordingly skipped in such cases.

The occupant can accordingly select between fixing and swiveling of the seat unit of the vehicle seat device 1 at will, enabling user-friendliness to be increased.

Note that in the first to the sixth examples, explanation has been given regarding specific processing performed by the seat ECU 22 in cases in which the seat unit 7 is fixed when a state in which the seat unit 7 is preferably fixed has been detected. However, fixing conditions for fixing the seat unit 7 are not limited to those described above. For example, boarding or alighting may be determined, and the lock actuator 36 may be controlled so as to fix the seat unit 7, simply by using the courtesy switch 26 to detect that the door is open. Alternatively, alighting may be determined, and the lock actuator 36 may be controlled so as to fix the seat unit 7, simply by detecting that the engine is turned off. Alternatively, alighting may be determined, and the lock actuator 36 may be controlled so as to fix the seat unit 7, simply by using the buckle sensor 30 to detect that the seatbelt is unfastened. Alternatively, the lock actuator 36 may be controlled so as to fix the seat unit 7 in cases in which other states in which the seat unit 7 is preferably fixed have been detected using other sensors or the like.

Next, explanation follows regarding a seventh example of processing performed by the seat ECU 22 of the vehicle seat control device 20 according to the present exemplary embodiment.

Figure 12:
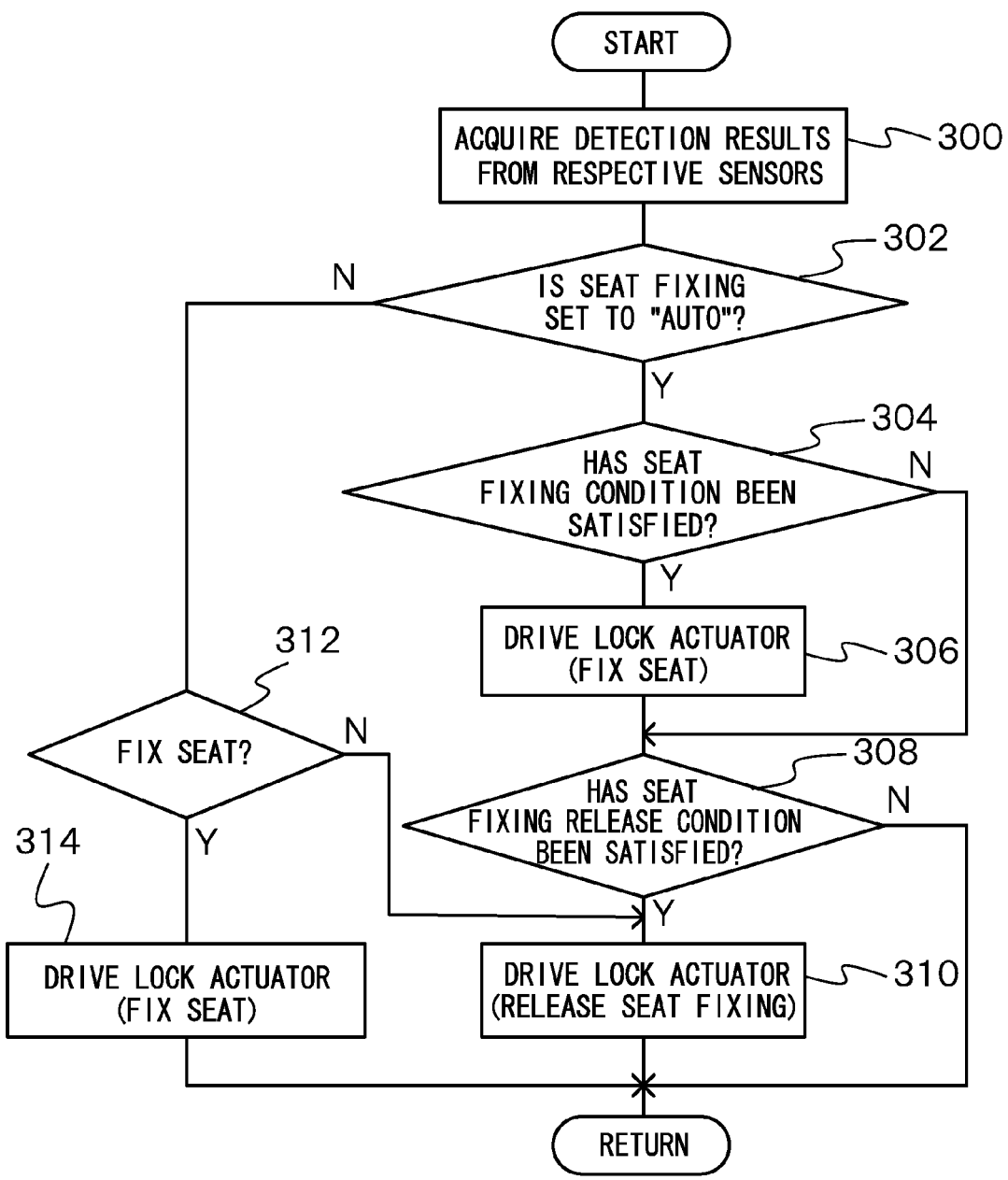
FIG. 12 is a flowchart illustrating a seventh example of processing performed by a seat ECU of a vehicle seat control device according to the present exemplary embodiment.

The first to sixth examples above have described examples of processing in which the seat unit 7 is fixed as part of the processing of the seat ECU 22. The seventh example, however, describes an example of a processing sequence including both fixing and fixing release of the seat unit 7. FIG. 12 is a flowchart illustrating the seventh example of processing performed by the seat ECU 22 of the vehicle seat control device 20 according to the present exemplary embodiment.

At step 300, the seat ECU 22 acquires detection results from respective sensors, and processing transitions to step 302. The respective sensors may include the shift position sensor 24, the courtesy switch 26, the seat pressure sensor 28, the buckle sensor 30, the vehicle speed sensor 32, and the seat fixing switch 34 described above, with the seat ECU 22 acquiring detection results from the sensors appropriately as needed.

At step 302, the seat ECU 22 determines whether or not the seat fixing switch 34 is set to the "auto" instruction. This determination is made by determining whether or not the seat ECU 22 has been set so as to fix the seat unit 7 automatically, based on a signal from the seat fixing switch 34. Processing transitions to step 304 when determination is affirmative, and processing transitions to step 312 when determination is negative.

At step 304, the seat ECU 22 determines whether or not a seat fixing condition has been satisfied. This determination is made, for example, by the seat ECU 22 determining whether or not the occupant is preparing to board or alight, as described in the first to the sixth examples, or according to whether or not a fixing instruction or the like of the seat unit 7 from the seat fixing switch 34 has been detected. Alternatively, determination may be made as to whether or not another condition in which the seat unit 7 is preferably fixed has been satisfied. Processing transitions to step 306 when determination is affirmative, and processing transitions to step 308 when determination is negative.

At step 306, the lock actuator 36 is driven under control of the seat ECU 22 so as to fix the seat unit 7, and processing transitions to step 308. As a point of detail, sometimes the seat unit 7 is already fixed when processing transitions to step 306. The processing of step 306 is accordingly skipped in such cases.

At step 308, the seat ECU 22 determines whether or not a seat fixing release condition has been satisfied. This determination is made, for example, by using the detection results of the shift position sensor 24 and/or the vehicle speed sensor 32 to determine whether or not a condition indicating that travel has started has been satisfied. Alternatively, detection results of other sensors or the like may be used to determine whether or not another condition, such as completion of travel preparations, has been satisfied. Processing transitions to step 310 when determination is affirmative, and processing returns to start other processing or repeat the same processing from the beginning when determination is negative.

At step 310, the lock actuator 36 is driven under control of the seat ECU 22 so as to release fixing of the seat unit 7 and the processing sequence returns to start other processing or repeat the same processing from the beginning As a point of detail, sometimes fixing of the seat unit 7 has already been released when processing transitions to step 310. The processing of step 310 is accordingly skipped in such cases.

At step 312, the seat ECU 22 determines whether or not seat fixing has been instructed. In this determination, the seat ECU 22 determines whether or not the seat fixing switch 34 has been operated to instruct fixing of the seat unit 7. Processing transitions to step 314 when determination is affirmative, and processing transitions to step 310, and seat fixing is released, when determination is negative.

At step 314, the lock actuator 36 is driven under control of the seat ECU 22 so as to fix the seat unit 7, and the processing sequence returns to start other processing or repeat the same processing from the beginning As a point of detail, sometimes the seat unit 7 is already fixed when processing transitions to step 314. The processing of step 314 is accordingly skipped in such cases.

Namely, when the seat fixing switch 34 is not set to "auto", fixing and fixing release of the seat unit are performed according to the instruction of the seat fixing switch 34, with priority being given to the instruction of the seat fixing switch 34, thereby enabling the seat unit 7 to be fixed, and fixing to be released, according to the will of the occupant.

Note that in the exemplary embodiment described above, explanation has been given regarding one example of a configuration of the vehicle seat device enabling the right side and the left side of the seat unit to move relative to each other in the vehicle up-down direction. However, other configurations enabling the left side and the right side of the seat unit to move relative to each other in the vehicle up-down direction may also be employed.

In the exemplary embodiment described above, explanation has been given regarding an example enabling fixing and fixing release of the seat unit 7. However, a configuration enabling fixing and fixing release of the seatback 8 may be applied to control fixing and fixing release in the seatback 8, instead of in the seat unit 7. Alternatively, fixing and fixing release may be controlled in both the seat unit 7 and the seatback 8.

The processing performed by the seat ECU 22 in the exemplary embodiment described above may be distributed as a program stored on a storage medium.

The present invention is not limited to the above description, and obviously various other modifications may be implemented within a range not departing from the spirit of the present invention.

What is claimed is:

1. A vehicle seat control device comprising:
   a fixing section that fixes swiveling movement about an axis of a seat unit on which an occupant sits, with the seat unit supported by a seat unit support section that supports the seat unit such that a right side and a left side of the seat unit are capable of moving relative to each other in the up-down direction; and
   a control section that controls the fixing section so as to fix the seat unit in cases in which a predetermined fixing condition for fixing the seat unit has been satisfied.

2. The vehicle seat control device of claim 1, wherein cases in which the fixing condition has been satisfied are cases in which data that indicates at least one action, selected from the group consisting of an occupant boarding the vehicle, an occupant alighting the vehicle, and an occupant preparing to alight, has been detected by a detection section for detecting the data.

3. The vehicle seat control device of claim 2, wherein the control section controls the fixing section so as to fix the seat unit in cases in which, as an occupant is boarding the vehicle or is alighting the vehicle, the detection section has detected a parking range for a shift position and opening of a door.

4. The vehicle seat control device of claim 2, wherein the control section controls the fixing section so as to fix the seat unit in cases in which, as an occupant is alighting the vehicle, the detection section has detected disappearance of pressure on the seat unit.

5. The vehicle seat control device of claim 2, wherein the control section controls the fixing section so as to fix the seat unit in cases in which, as an occupant is alighting the vehicle, the detection section has detected a turned off engine and an unfastened seatbelt.

6. The vehicle seat control device of claim 2, wherein the control section controls the fixing section so as to fix the seat unit in cases in which, as an occupant is alighting the vehicle, the detection section has detected a turned off engine.

7. The vehicle seat control device of claim 2, wherein the control section controls the fixing section so as to fix the seat unit in cases in which, as an occupant is preparing to alight, the detection section has detected a turned off engine and a vehicle speed of 0.

8. The vehicle seat control device of claim 1, further comprising:
   a fixing instruction section that instructs fixing of the seat unit by the fixing section, wherein
   the control section controls the fixing section so as to fix the seat unit in cases in which, as the fixing condition, fixing has been instructed by the fixing instruction section.

9. The vehicle seat control device of claim 1, further comprising:
   an instruction section to instruct fixing, and fixing release, of the seat unit by the fixing section, wherein
   the control section prioritizes instruction by the instruction section and controls the fixing section according to instruction of the instruction section.

10. The vehicle seat control device of claim 1, wherein the control section further controls the fixing section so as to make the seat unit movable in cases in which a predetermined movement condition for making the seat unit movable has been satisfied.

11. A vehicle seat device comprising:
    a seat unit on which an occupant sits;
    a seat unit support section that supports the seat unit such that a right side and a left side of the seat unit are capable of moving relative to each other in a vehicle up-down direction; and
    the vehicle seat control device of claim 1.

* * * * *